(12) United States Patent
Crino

(10) Patent No.: US 12,241,587 B2
(45) Date of Patent: Mar. 4, 2025

(54) QUICK ATTACH ANCHOR SYSTEMS AND METHODS

(71) Applicant: ENGAGE ENTERPRISES LLC, Beaverton, OR (US)

(72) Inventor: Matthew Crino, Beaverton, OR (US)

(73) Assignee: Engage Enterprises LLC, Beaverton, OR (US)

(*) Notice: Subject to any disclaimer, the term of this patent is extended or adjusted under 35 U.S.C. 154(b) by 0 days.

(21) Appl. No.: 18/471,537

(22) Filed: Sep. 21, 2023

(65) Prior Publication Data

US 2024/0401739 A1    Dec. 5, 2024

Related U.S. Application Data

(60) Provisional application No. 63/505,328, filed on May 31, 2023.

(51) Int. Cl.
*F16M 13/02*    (2006.01)
*F16B 2/18*    (2006.01)

(52) U.S. Cl.
CPC ............. *F16M 13/022* (2013.01); *F16B 2/18* (2013.01)

(58) Field of Classification Search
CPC ................................ F16M 13/022; F16B 2/18
See application file for complete search history.

(56) References Cited

U.S. PATENT DOCUMENTS

| | | | |
|---|---|---|---|
| 5,829,723 A * | 11/1998 | Brunner .............. | A61M 5/1415 248/222.13 |
| 8,757,570 B2 * | 6/2014 | Ernst .................. | A47G 25/0607 248/223.41 |
| 2007/0158513 A1 * | 7/2007 | LeVahn ................. | A61B 17/02 600/234 |
| 2010/0258690 A1 * | 10/2010 | Kleitsch .............. | A61M 5/1417 248/219.4 |

* cited by examiner

*Primary Examiner* — Anita M King
(74) *Attorney, Agent, or Firm* — Dorsey & Whitney LLP

(57) ABSTRACT

Quick attach anchor systems and methods are provided. A system may include an anchor and a faceplate coupled to the anchor. The anchor may include a base, a plate extending from the base to define a slot between the plate and the base, and a cam rotatable between a locked position and an unlocked position. The locked position may be configured to clamp a structure within the slot to secure the device to the structure. The unlocked position may be configured to unclamp the structure within the slot. Additional systems and associated methods are also provided.

20 Claims, 6 Drawing Sheets

QUICK ATTACH ANCHOR SYSTEMS AND METHODS

CROSS-REFERENCE TO RELATED APPLICATION

This application claims the benefit of U.S. Provisional Application No. 63/505,328, filed May 31, 2023, the disclosure of which is hereby incorporated by reference in its entirety.

TECHNICAL FIELD

The present disclosure relates generally to attachment devices, such as quick attach anchor systems and methods.

BACKGROUND

Anchor systems are often used to attach a securement point to the exterior of a house or structure, such as to lap siding of the house or structure. These systems often include a number of drawbacks, as understood by a person of skill in the art. Therefore, a need exists for improved quick attach anchor systems and methods.

BRIEF SUMMARY

Various embodiments of the disclosure include an anchor device for selective securement to a structure. The anchor device may include a base. The anchor device may include a plate extending from the base. The plate may define a slot between the plate and the base. The anchor device may include a cam rotatable between a locked position and an unlocked position. The locked position may be configured to clamp a structure within the slot to secure the device to the structure. The unlocked position may be configured to unclamp the structure within the slot.

In some examples, the base may include a recess. The cam may be positioned to rotate within the recess between the locked position and the unlocked position. In some examples, the anchor device may include first and second sidewalls extending along opposing sides of the base. The first and second sidewalls may define the recess therebetween. The anchor device may include a pin extending between the first and second sidewalls and about which the cam rotates.

In some examples, the anchor device may include a tab positioned at least partially opposite the plate across the slot. The tab may be configured to bend resiliently towards the plate with movement of the cam towards the locked position to clamp the structure within the slot. In some examples, the anchor device may include a grip pad positioned on at least one of the plate or the tab.

In some examples, the anchor device may include a faceplate coupled to the base. In some examples, the faceplate may be slid along a face of the base and onto at least one securement track of the base to secure the faceplate to the base. In some examples, the faceplate may include a top wall to engage a top of the base when the faceplate is seated on the base. The faceplate may include a clip to engage the cam to limit a removal of the faceplate from the base. In some examples, the faceplate may include a hook.

Various embodiments of the disclosure include a system for selective securement to a structure. The system may include an anchor. The system may include a faceplate coupled to the anchor. The anchor may include a base. The anchor may include a plate extending from the base. The plate may define a slot between the plate and the base. The anchor may include a cam rotatable between a locked position and an unlocked position. The locked position may be configured to clamp a structure within the slot to secure the device to the structure. The unlocked position may be configured to unclamp the structure within the slot.

In some examples, the faceplate may be slid along a face of the anchor and onto at least one securement track of the anchor to secure the faceplate to the anchor. In some examples, the faceplate may include a top wall to engage a top of the base when the faceplate is slid onto the anchor. The faceplate may include a clip to engage the cam to limit a removal of the faceplate from the anchor.

In some examples, the base may include a recess. The cam may be positioned to rotate within the recess between the locked position and the unlocked position. The faceplate may conceal the cam in the locked position. In some examples, the faceplate may need to be removed at least partially from the anchor to move the cam to the unlocked position.

In some examples, the faceplate may include a hook.

Various embodiments of the disclosure include a method of selectively securing an anchor to a structure. The method may include securing an anchor to a structure. The anchor may include a base. The anchor may include a plate extending from the base. The plate may define a slot between the plate and the base. The anchor may include a cam coupled to the base. The securing may include positioning the structure at least partially within the slot of the anchor. The securing may include rotating the cam of the anchor to a locked position to clamp the structure within the slot.

In some examples, the method may include coupling a faceplate to the anchor. In some examples, the coupling may include sliding the faceplate along a face of the anchor and onto at least one securement track of the anchor. In some examples, the method may include removing the faceplate from the anchor. The removing may include unclipping a clip of the faceplate from the cam and sliding the faceplate off the anchor.

In some examples, the method may include rotating the cam of the anchor to an unlocked position to unclamp the structure within the slot.

In some examples, the structure may include lap siding.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claims or their applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of an anchoring system described herein and should not be construed as a complete depiction of the scope of the claimed features.

Figure 1:
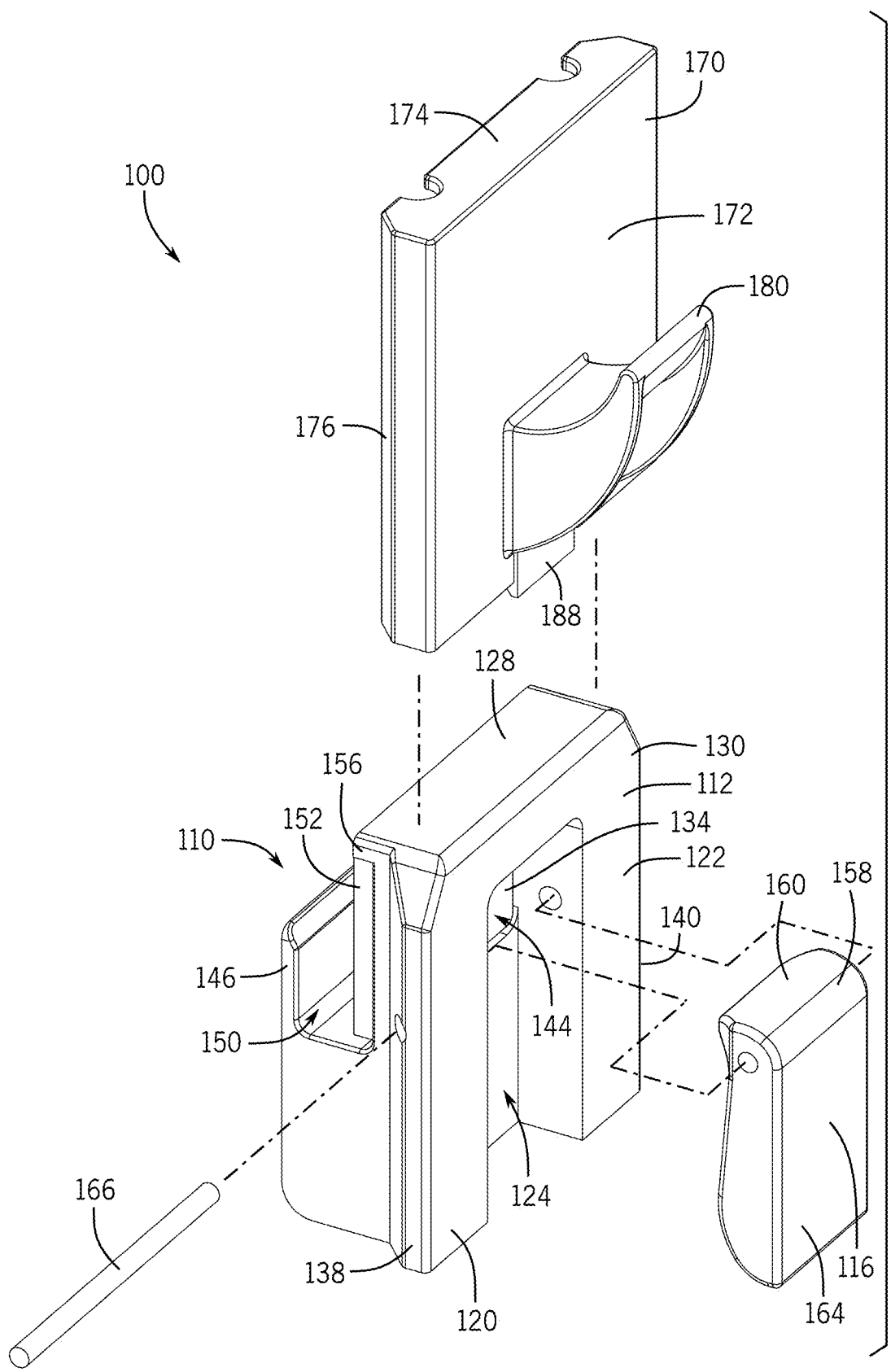
FIG. 1 is a top front exploded view of an anchor system, according to one or more embodiments of the disclosure.

Embodiments of this disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Embodiments of the present disclosure relate to quick attach anchor systems and methods. The discussion of any particular element, feature, component, assembly, or the like, should be understood as being a standalone element, or may be integrated into a system. Relatedly, although the discussion presented herein is related to quick attach anchors, the concepts and embodiments may be applicable other types of anchoring systems. Traditional anchor systems or devices are often permanently attached to a building structure, or at least cause permanent damage to the structure to which the anchor is attached. For example, traditional anchors can leave permanent holes from fasteners and/or damage a building due to adhesive (e.g., surface damage from adhesive removal, permanent adhesive residue, etc.). Some traditional anchors are often one-time use only, or at least incorporate consumables that must be replaced for each use. Additionally, or alternatively, traditional anchors can be time consuming to install and/or remove, leading to installation/removal inefficiency and/or frustration.

In one or more embodiments, an anchor is provided for releasable or selective securement to an object or structure, such as an exterior portion of a house or structure (e.g., to lap siding or other siding products), without adhesive, fasteners, or permanent attachment. The anchor may be quickly attached by a cam mechanism, the cam mechanism operable to clamp the anchor to the structure (e.g., to the face of the siding), such as within a slot of the anchor. Releasing the cam mechanism may unclamp the structure within the slot to allow removal of the anchor. A faceplate may be coupled to (e.g., slid onto) the anchor to provide a securement or hold point (e.g., a hook) and limit the release of the cam mechanism. In embodiments, the faceplate may be part of a modular system, such that different faceplates may be secured to the anchor to provide different securement points for the anchor.

In this manner, the anchor device or system described herein may be easily secured and removed from lap siding or other building products, thereby improving installation/removal efficiency. In addition, or alternatively, the selective securement of the anchor to a building structure may be done without permanent attachment. As a result, the anchor may be secured and removed from the building structure without damaging the structure itself or the anchor. In addition, or alternatively, the systems and devices described herein may provide a modular system of varying anchors or securement points to suit a particular application. For example, the anchor may provide varying load supporting points, tie down or lashing points, coupling devices, or the like, without intent to limit. In such examples, one anchor point type may be quickly and easily swapped for another anchor point type, such as via modular faceplate designs. The anchor may also be reusable without the need to replace one-time use elements, such that the anchor may be used repeatedly without maintenance, part replacement, or upkeep.

Figure 2:
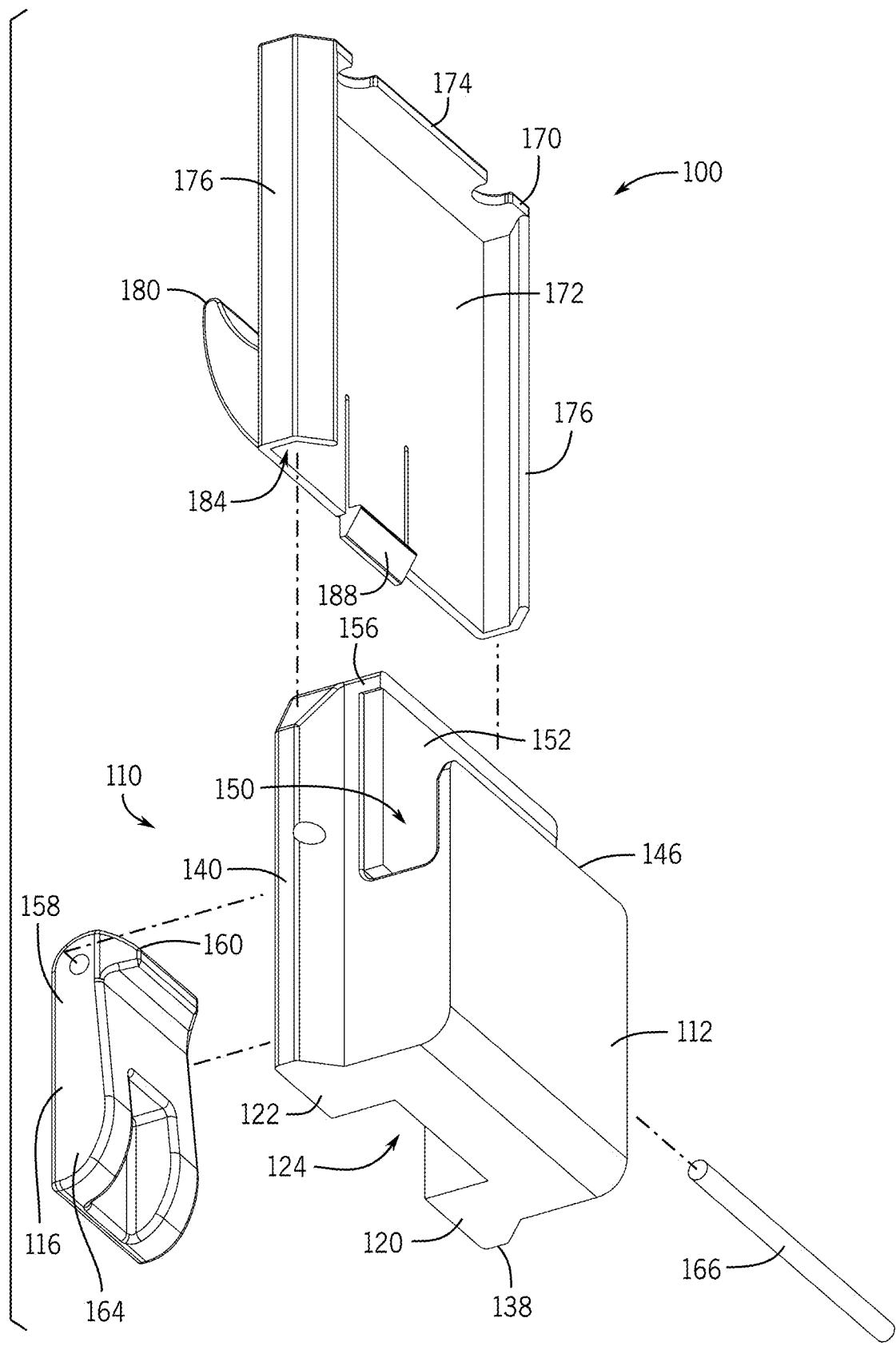
FIG. 2 is a bottom rear exploded view of the anchor system of FIG. 1.

FIG. 1 is a top front exploded view of an anchor system or device 100, according to one or more embodiments of the disclosure. FIG. 2 is a bottom rear exploded view of the anchor system 100 of FIG. 1. In the embodiments of FIGS. 1-2, the anchor system 100 includes an anchor 110 including a base 112 and a cam 116. The base 112 may include first and second sidewalls 120, 122 extending along opposing sides of the base 112, such as to define a recess 124 therebetween. A third wall 128 may extend between the first and second sidewalls 120, 122 along the top of the base 112 and at least partially define the recess 124. For instance, the first sidewall 120, second sidewall 122, and third wall 128 may collectively define a face 130 (e.g., a flat front face) of the base 112, with the recess 124 defined in the face 130. As shown in FIG. 1, the bottom of the recess 124 may be defined at least partially by a tab 134 extending from the third wall 128.

In embodiments, the anchor 110 includes at least one securement track. For example, the first sidewall 120 may define a first securement track 138, such as via one or more portions of the first sidewall 120 extending outwardly from the base 112 as shown. Similarly, the second sidewall 122 may define a second securement track 140, such as via one or more portions of the second sidewall 122 extending outwardly from the base 112. Such examples are illustrative only, and the securement tracks may be defined differently in other configurations. The securement tracks may be used to couple an accessory to the anchor 110, such as via sliding engagement of the accessory with the securement track(s), as described below.

In embodiments, the tab 134 includes a distal end 144 that is free to move (e.g., bend) relative to the base 112 to facilitate gripping of an object or structure to which the anchor 110 is secured. For example, a plate 146 may extend from the base 112 to define a slot 150 between the plate 146 and the base 112. In embodiments, the tab 134 is positioned at least partially opposite the plate 146 across the slot 150. In such embodiments, the tab 134 may be a resilient member configured to bend resiliently towards the plate 146 to grip a structure (e.g., lap siding, trim, fascia, cladding, sheathing, paneling, etc.) within the slot 150. In embodiments, the anchor 110 may include a grip pad 152 positioned on at least one of the plate 146 or the tab 134 to further aid gripping of the structure within the slot 150. As shown, an overhang 156 may extend from the third wall 128 above the grip pad 152, such as to protect the end of the grip pad 152 from damage during attachment of the anchor 110 to the structure. For example, the overhang 156 may provide a durable wear surface for attachment and removal of the anchor 110.

The cam 116 may include a base portion 158 defining a cam surface 160, and a lever 164 extending from the base portion 158. The cam 116 may be positioned to rotate within the recess 124. For example, the anchor 110 may include a pin 166 extending through the base portion 158 of the cam 116 between the first and second sidewalls 120, 122, such as through pin cavities defined in or through the first and second sidewalls 120, 122, although other configurations are contemplated. The cam 116 may rotate about the pin 166 between an unlocked position (see FIGS. 3A-3B, for instance) and a locked position (see FIGS. 4A-4B, for instance). The locked position may be configured to clamp the structure within the slot 150 to secure the anchor 110 to the structure. Conversely, the unlocked position may be configured to unclamp the structure within the slot 150.

With continued reference to FIGS. 1-2, the anchor system 100 may include a faceplate 170 coupled to the anchor 110, such as to the base 112. As shown, the faceplate 170 includes a front wall 172, a top wall 174, and opposing sidewalls 176. In embodiments, a hook 180 or other securement point may extend from the front wall 172, such as to hang or support items from the anchor 110. The hook 180 is for illustration purposes only, and the faceplate 170 may include any suitable securement point to attach and/or rest an item to or on the anchor 110. For example, the faceplate 170 may include a tie down anchor or lashing point (e.g., a D-ring, cleat, etc.), magnetic couplers, threaded holes, among other securement points or devices. In embodiments, the faceplate 170 may be integrated into an accessory or object. For example, a light, frame, or other object to be attached to the side of a house or structure may include the faceplate 170 (or similar structure) for attachment to the anchor 110.

The faceplate 170 may be slid along the face 130 of the base 112 and onto at least one securement track of the base 112 to secure the faceplate 170 to the anchor 110. For example, the sidewalls 176 may define respective cavities 184 to slidably receive the first and second sidewalls 120, 122 of the base 112, such as the sidewalls 176 of the faceplate 170 being shaped complementary to the first and second sidewalls 120, 122 of the base 112 (see FIGS. 2 and 5C). In embodiments, the top wall 174 may engage a top of the base 112 when the faceplate 170 is slid onto the anchor 110 (see FIG. 5B). In embodiments, the faceplate 170 may include a clip 188 to engage a portion of the anchor 110. For example, the clip 188 may engage the lever 164 of the cam 116 to limit removal of the faceplate 170 from the anchor 110 (see FIG. 5B). In embodiments, the faceplate 170 may conceal the cam 116 in the locked position (see FIGS. 5A-5B). For instance, sliding the faceplate 170 onto the anchor 110 may slide the faceplate 170 over the cam 116. In such embodiments, the faceplate 170 must be removed at least partially from the anchor 110 to move the cam 116 to the unlocked position.

FIGS. 3A-6 illustrate various views of the anchor system 100 secured to a structure 300. The anchor system 100 (e.g., the anchor 110) may be secured to an object or structure to provide a securement point without adhesive, fasteners, or permanent attachment. For example, the anchor 110 may be releasably secured to lap siding, such as to a face and/or bottom portion of an installed row of lap siding. Once secured, the anchor system 100 may hold or otherwise support another plank of lap siding during installation (e.g., using hook 180), such as for one-person installation of lap siding. The anchor 110 may quickly attach to the lap siding, such as via the cam 116, as detailed below. The cam 116 may be released to remove the anchor 110 from the lap siding, such as without damage to the lap siding. The anchor 110 may then be moved to the next row of siding to continue siding installation.

Although shown and described with reference to siding products, the anchor system 100 may be secured to other objects or structures, including boards, fascia, cladding, trim, non-siding products, or any wall or portion of a building, without intent to limit. Additionally, or alternatively, the anchor system 100 may be secured to an exterior of a house or structure to support one or more objects other than a siding plank for the next row of siding. For instance, the anchor system 100 may support décor, accessories, lights, cords, tubing/conduit, or any other item to be secured to the exterior of a house or structure. In embodiments, the anchor system 100, or at least portions thereof (e.g., the faceplate 170), may be integrated into an accessory itself, such as to allow quick attachment of the accessory to the lap siding of a house or structure, as described below.

Figure 3A:
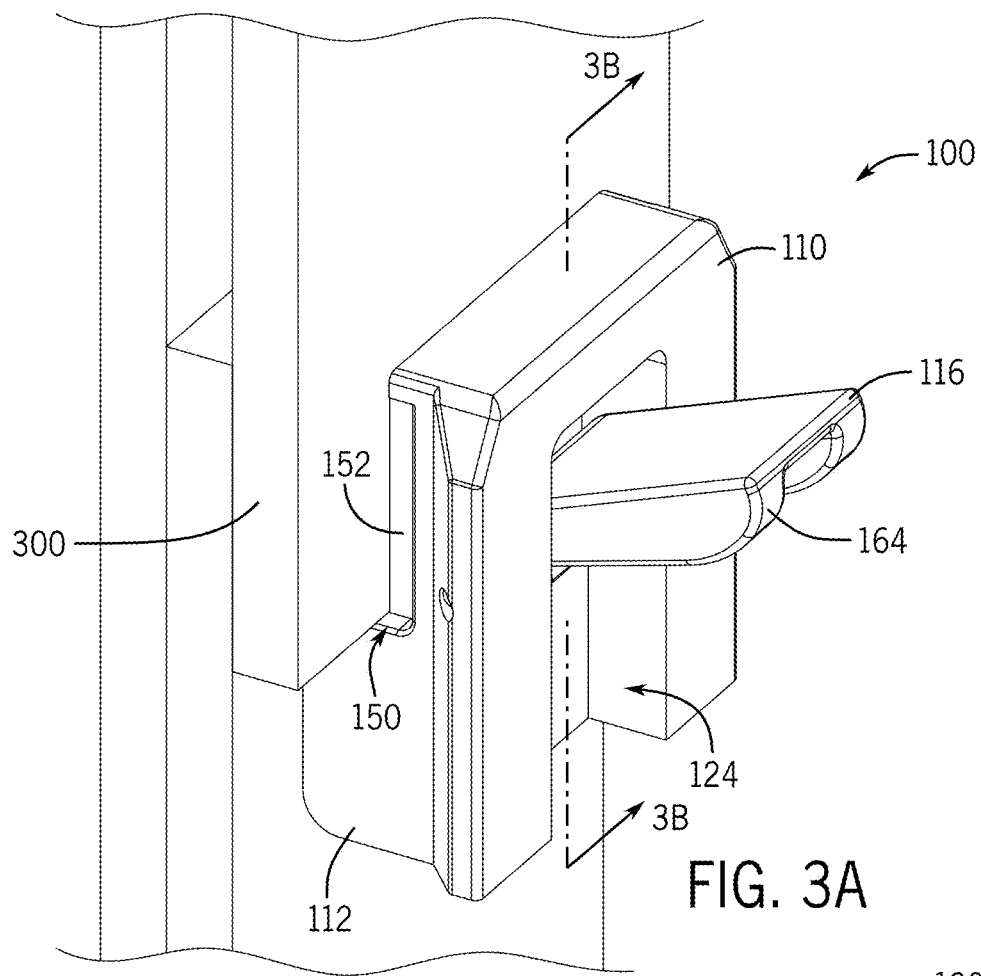
FIG. 3A is an isometric view of an anchor coupled to an example structure and illustrating the anchor in an unlocked position, according to one or more embodiments of the disclosure.
Figure 3B:
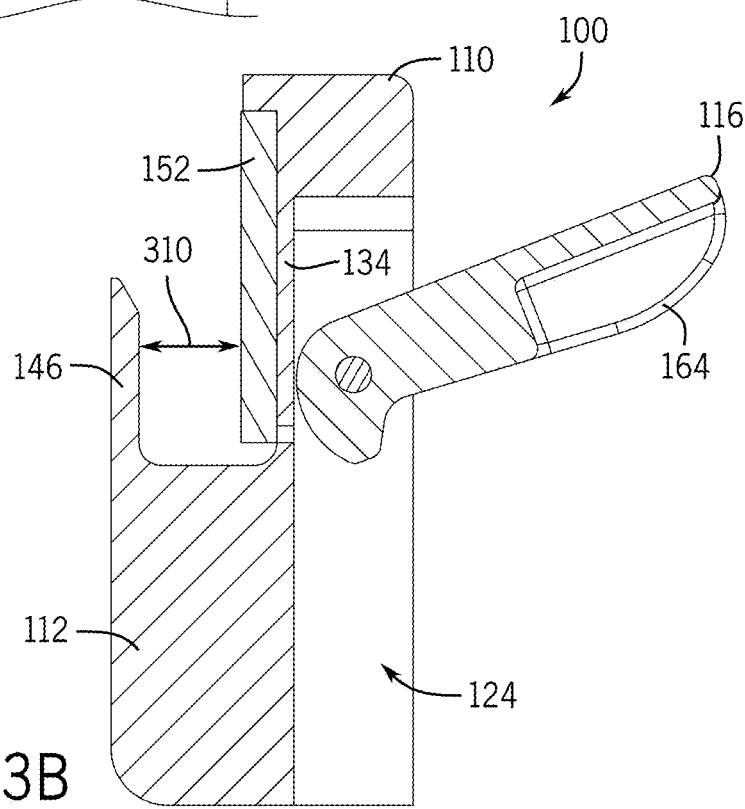
FIG. 3B is a cross-section view taken along line 3B-3B of FIG. 3A.

FIG. 3A illustrates the anchor 110 coupled to lap siding and showing the anchor 110 in an unlocked position, according to one or more embodiments of the disclosure. FIG. 3B is a cross-section view taken along line 3B-3B of FIG. 3A with the structure 300 removed for illustration purposes. Referring to FIGS. 3A-3B, in the unlocked position, the lever 164 of the cam 116 may be rotated away from the base 112 (e.g., at least partially out of the recess 124) to widen the slot 150 and allow lap siding or another object/structure to be either inserted/seated within the slot 150 or removed from the slot 150. For example, movement of the cam 116 to the unlocked position may increase a distance 310 between the plate 146 and the tab 134.

Figure 4A:
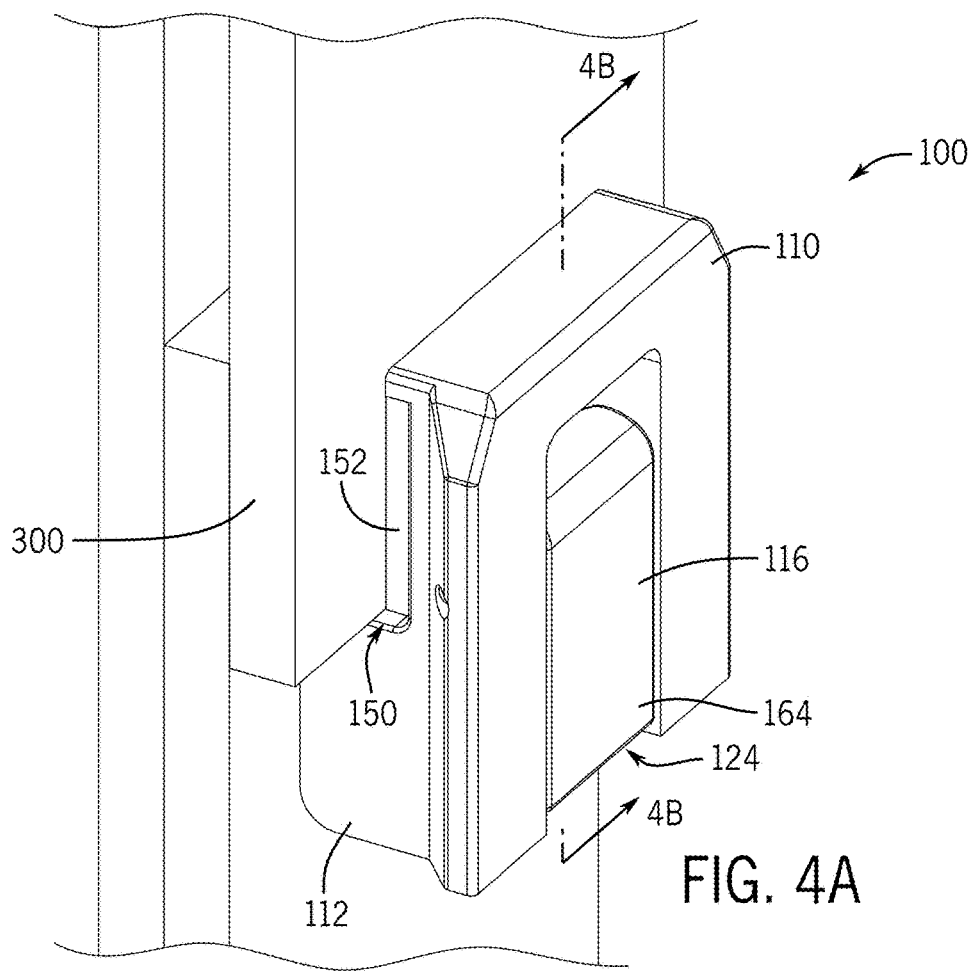
FIG. 4A is an isometric view of the anchor of FIG. 3A and illustrating the anchor in a locked position, according to one or more embodiments of the disclosure.
Figure 4B:
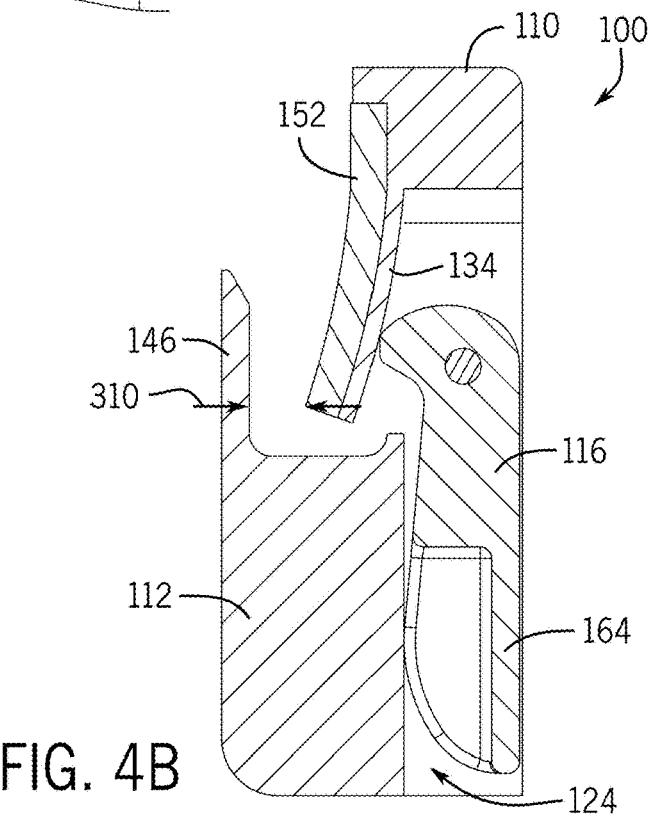
FIG. 4B is a cross-section view taken along line 4B-4B of FIG. 4A.

FIG. 4A illustrates the anchor 110 coupled to lap siding and showing the anchor 110 in a locked position, according to one or more embodiments of the disclosure. FIG. 4B is a cross-section view taken along line 4B-4B of FIG. 4A with the structure 300 removed for illustration purposes. Referring to FIGS. 4A-4B, in the locked position, the lever 164 of the cam 116 may be rotated towards the base 112 (e.g., into the recess 124) to narrow the slot 150 and grip the structure 300 within the slot 150. For instance, movement of the cam 116 to the locked position may decrease the distance between the plate 146 and the tab 134 to pinch the structure 300 within the slot 150. For example, the cam surface 160 may bear against the tab 134 to move the tab 134 towards the plate 146 as the cam 116 is rotated to the locked position. In this manner, the tab 134 may provide a bearing surface for the cam 116. In embodiments, the bearing surface and/or cam surface 160 may provide a low friction engagement of the cam 116 to the tab 134, such as to facilitate rotation of the cam 116 between positions.

As shown, the cam 116 may be positioned entirely or almost entirely within the recess 124 when in the locked position. For example, once in the locked position, the lever 164 may sit flush or substantially flush with the first and second sidewalls 120, 122 (e.g., flush with the face 130). In such embodiments, the lever 164 may define a flat or generally flat front of the anchor 110 when the cam 116 is in the locked position.

As noted above, the tab 134 or resilient member may deform (e.g., resiliently bend towards the plate 146) with movement of the cam 116 towards the locked position. For example, the tab 134 may spring back (e.g., away from the plate 146) when the cam 116 moves to the unlocked position, although other configurations are contemplated. In the locked position, the grip pad 152 may compress against the structure 300 to increase the anchor's grip on the structure 300 within the slot 150.

Figure 5A:
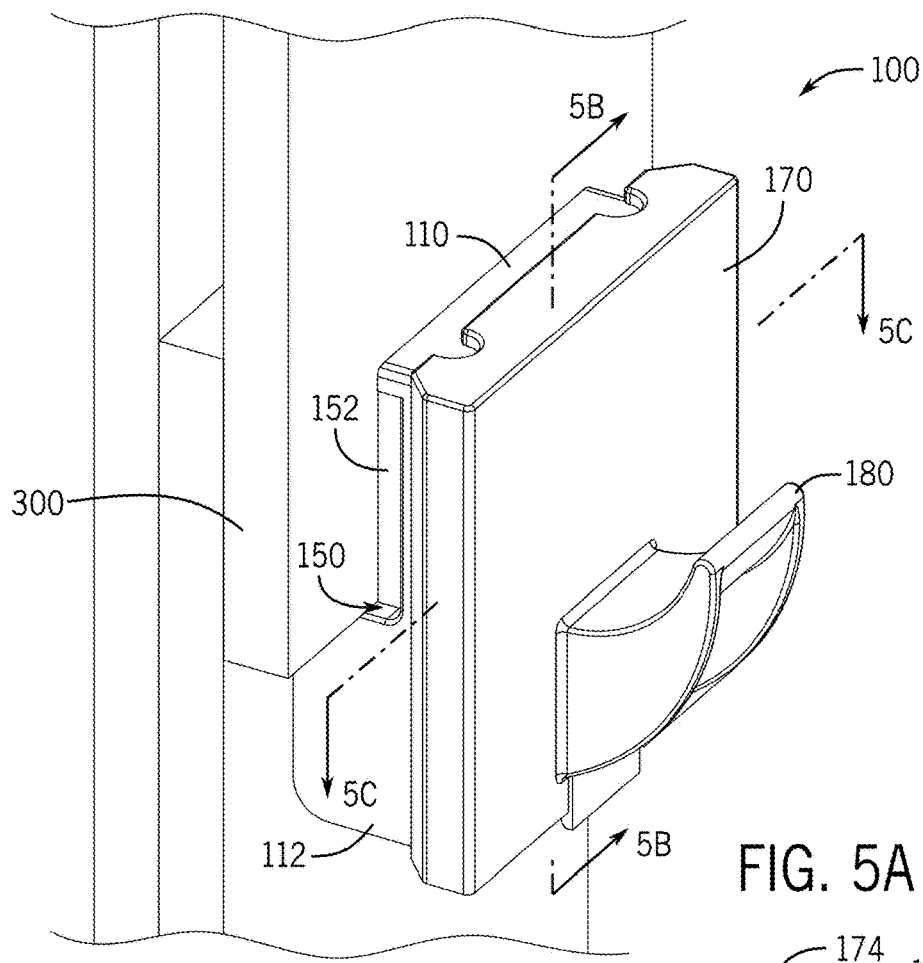
FIG. 5A is an isometric view of the anchor of FIG. 3B and illustrating a faceplate coupled to the anchor, according to one or more embodiments of the disclosure.
Figure 5B:
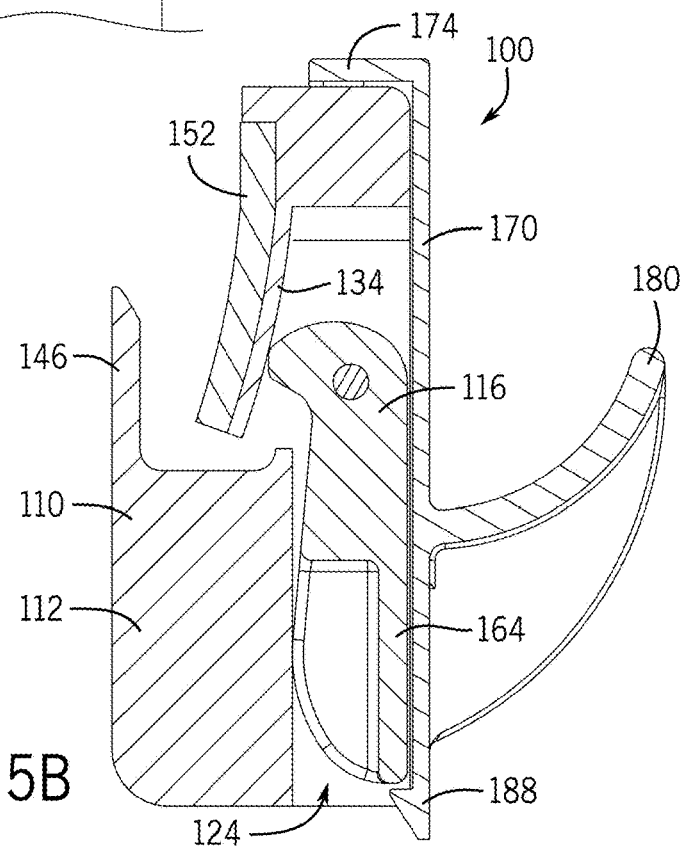
FIG. 5B is a cross-section view taken along line 5B-5B of FIG. 5A.
Figure 5C:
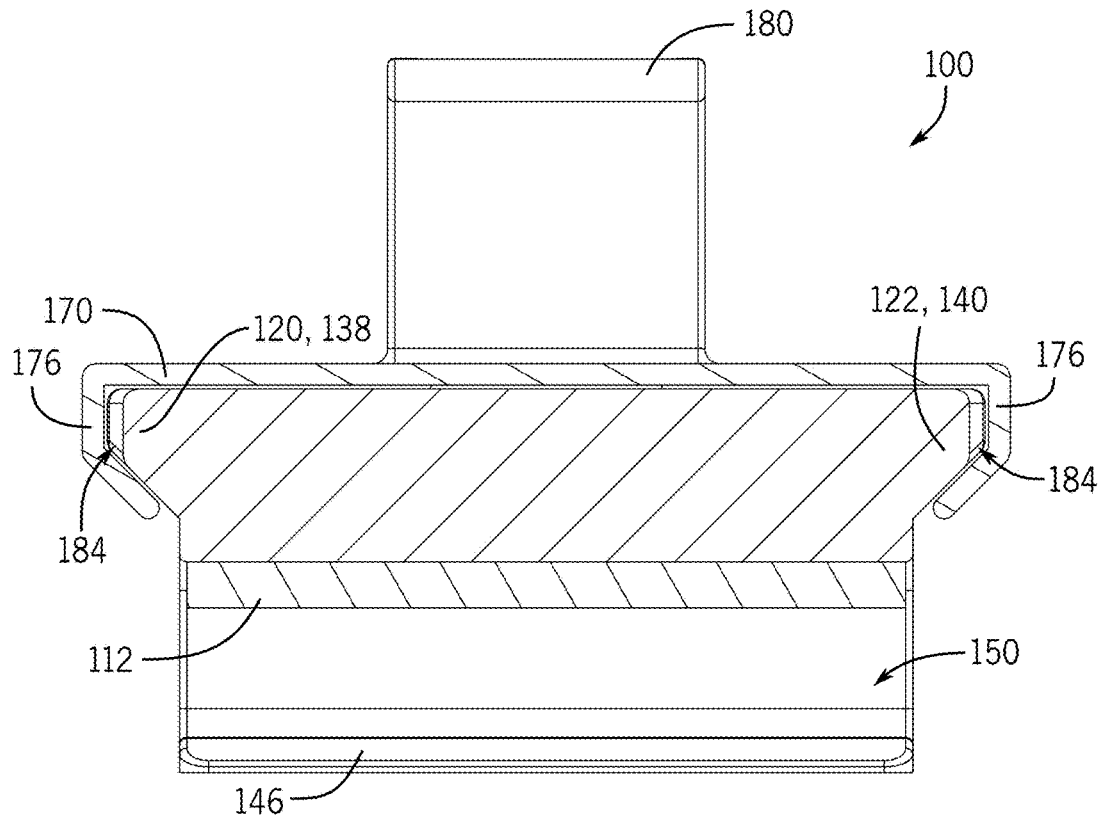
FIG. 5C is a cross section view taken along line 5C-5C of FIG. 5A.

FIG. 5A illustrates the anchor 110 coupled to lap siding and showing the faceplate 170 coupled to the anchor 110, according to one or more embodiments of the disclosure. FIG. 5B is a cross-section view taken along line 5B-5B of FIG. 5A with the structure 300 removed for illustration purposes. FIG. 5C is a cross section view taken along line 5C-5C of FIG. 5A. Referring to FIGS. 5A-5C, once the anchor 110 is positioned in the locked position, the faceplate 170 may be slid onto the anchor 110. For example, the faceplate 170 may be slid onto the first and second securement tracks 138, 140 of the base 112, such as by the first and second sidewalls 120, 122 of the base 112 received within the cavities 184 defined by the sidewalls 176 of the faceplate 170 (see FIG. 5C). The faceplate 170 may be slid onto the anchor 110 until the top wall 174 of the faceplate 170 engages the top of the base 112 and the clip 188 engages the lever 164 of the cam 116 (see FIG. 5B). To remove the faceplate 170, the clip 188 may disengage the lever 164 to allow sliding of the faceplate 170 off the anchor 110. In embodiments, the clip 188 may also require disengagement from the third wall 128 to completely remove the faceplate 170 from the anchor 110.

Figure 6:
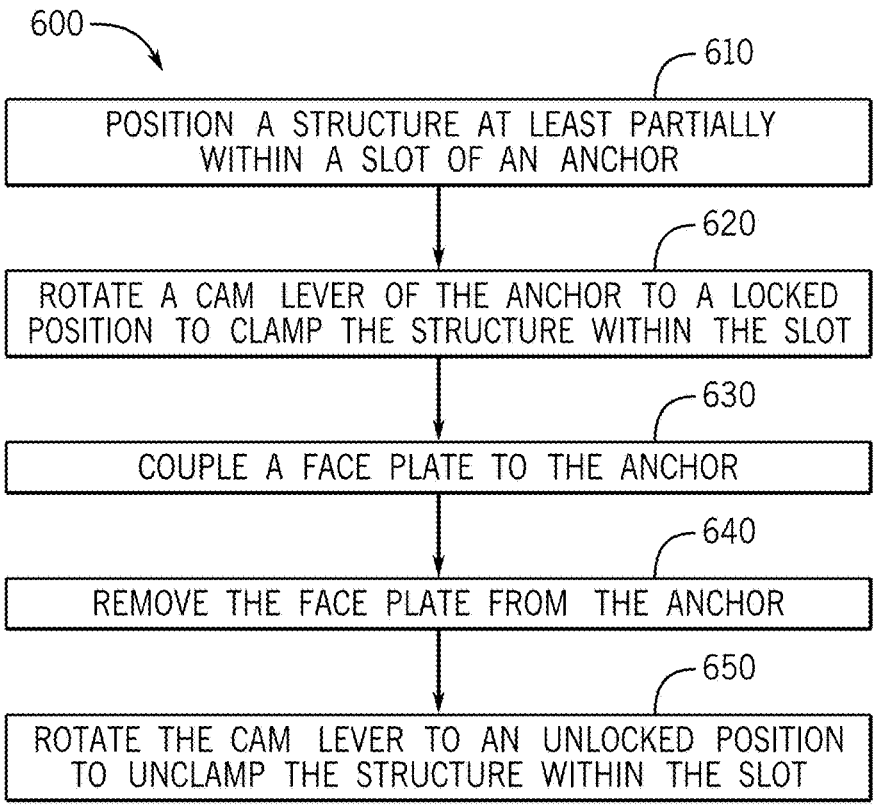
FIG. 6 is a flowchart of a method of securing an anchor to a structure, according to one or more embodiments of the disclosure.

FIG. 6 is a flowchart of a method 600 of securing (e.g., selectively) an anchor to a structure, according to one or more embodiments of the disclosure. For explanatory purposes, the method 600 is described herein with reference to FIGS. 1-5C, although the method 600 is not limited to the embodiments illustrated in FIGS. 1-5C. Note that one or more operations in FIG. 6 may be combined, omitted, and/or performed in a different order as desired.

In embodiments, the method 600 includes securing an anchor to a structure or object. The anchor may be similar to anchor 110, described above. For example, the anchor may include base 112, plate 146 extending from base 112 to define slot 150 between plate 146 and base 112, and cam 116 coupled to base 112. In block 610, the method 600 includes positioning a structure (e.g., structure 300) at least partially within the slot of the anchor. For instance, the structure (e.g., lap siding) may be slid or seated within the slot 150, with the plate 146 and tab 134 positioned on opposing sides of the structure.

In block 620, the method 600 includes rotating the cam of the anchor to a locked position to clamp the structure within the slot, such as in a manner as described above. For example, rotating the cam to a locked position may clamp the anchor to the structure, such as to secure the anchor to the face of the structure. In embodiments, rotating the cam to the locked position may narrow the slot by decreasing the distance between the plate and the tab to clamp/pinch the structure within the slot.

In block 630, the method 600 includes coupling a faceplate (e.g., faceplate 170) to the anchor, such as in a manner as described above. For instance, block 630 may include sliding the faceplate along a face (e.g., face 130) of the anchor and onto at least one securement track of the anchor.

In block 640, the method 600 includes removing the faceplate from the anchor. Block 640 may include unclipping a clip (e.g., clip 188) of the faceplate from the cam and/or other portions of the anchor and sliding the faceplate off the anchor, such as in a manner as described above.

In block 650, the method 600 includes rotating the cam to an unlocked position to unclamp the structure within the slot, such as in a manner as described above. For instance, rotating the cam to the unlocked position may widen the slot by increasing the distance between the plate and the tab.

All relative and directional references (including top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

Any description of a particular component being part of a particular embodiment, is meant as illustrative only and should not be interpreted as being required to be used with a particular embodiment or requiring other elements as shown in the depicted embodiment. Thus, the present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An anchor device for selective securement to a structure, the anchor device comprising:
    a base;
    a resilient member;
    a plate extending from the base to define a slot between the plate and the base; and
    a cam rotatable between a locked position and an unlocked position, the locked position configured to clamp a structure within the slot via a deformation of the resilient member by the cam to secure the device to the structure, the unlocked position configured to unclamp the structure within the slot.

2. The anchor device of claim 1, wherein:
    the base comprises a recess; and
    the cam is positioned to rotate within the recess between the locked position and the unlocked position.

3. The anchor device of claim 2, further comprising:
    first and second sidewalls extending along opposing sides of the base, the first and second sidewalls defining the recess therebetween; and
    a pin extending between the first and second sidewalls and about which the cam rotates.

4. The anchor device of claim 1, wherein the resilient member comprises a tab positioned at least partially opposite the plate across the slot, the tab configured to bend resiliently towards the plate with movement of the cam towards the locked position to clamp the structure within the slot.

5. The anchor device of claim 4, further comprising a grip pad positioned on at least one of the plate or the tab.

6. The anchor device of claim 1, further comprising a faceplate coupled to the base.

7. The anchor device of claim 6, wherein the faceplate is slid along a face of the base and onto at least one securement track of the base to secure the faceplate to the base.

8. The anchor device of claim 7, wherein the faceplate comprises:
a top wall to engage a top of the base when the faceplate is seated on the base; and
a clip to engage the cam to limit a removal of the faceplate from the base.

9. The anchor device of claim 6, wherein the faceplate comprises a hook.

10. A system for selective securement to a structure, the system comprising:
an anchor comprising:
a base,
a resilient member,
a plate extending from the base to define a slot between the plate and the base, and
a cam rotatable between a locked position and an unlocked position, the locked position configured to clamp a structure within the slot via a deformation of the resilient member by the cam to secure the anchor to the structure, the unlocked position configured to unclamp the structure within the slot; and
a faceplate coupled to the anchor.

11. The system of claim 10, wherein:
the faceplate is slid along a face of the anchor and onto at least one securement track of the anchor to secure the faceplate to the anchor; and
the faceplate comprises:
a top wall to engage a top of the base when the faceplate is slid onto the anchor, and
a clip to engage the cam to limit a removal of the faceplate from the anchor.

12. The system of claim 10, wherein:
the base comprises a recess;
the cam is positioned to rotate within the recess between the locked position and the unlocked position; and
the faceplate conceals the cam in the locked position.

13. The system of claim 12, wherein the faceplate must be removed at least partially from the anchor to move the cam to the unlocked position.

14. The system of claim 10, wherein the faceplate comprises a hook.

15. A method of selectively securing an anchor to a structure, the method comprising:
securing an anchor to a structure, the anchor comprising a base, a resilient member, a plate extending from the base to define a slot between the plate and the base, and a cam coupled to the base,
wherein the securing comprises:
positioning the structure at least partially within the slot of the anchor, and
rotating the cam to a locked position, thereby causing a deformation of the resilient member to clamp the structure within the slot.

16. The method of claim 15, further comprising coupling a faceplate to the anchor.

17. The method of claim 16, wherein the coupling comprises sliding the faceplate along a face of the anchor and onto at least one securement track of the anchor.

18. The method of claim 16, further comprising removing the faceplate from the anchor, wherein the removing comprises unclipping a clip of the faceplate from the cam and sliding the faceplate off the anchor.

19. The method of claim 15, further comprising rotating the cam of the anchor to an unlocked position to unclamp the structure within the slot.

20. The method of claim 15, wherein the structure comprises lap siding.

* * * * *